United States Patent [19]

Papasideris

[11] 4,085,833
[45] Apr. 25, 1978

[54] HYDROSTATIC TRANSMISSION CONTROL

[75] Inventor: Stamos I. Papasideris, Bristol, Ill.

[73] Assignee: Caterpillar Tractor Co., Peoria, Ill.

[21] Appl. No.: 754,296

[22] Filed: Dec. 27, 1976

[51] Int. Cl.² ............... B60K 41/26; G05G 11/00; G05G 5/08

[52] U.S. Cl. ............... 192/4 B; 74/473 R; 74/479; 74/483 R

[58] Field of Search ............... 192/4 A, 4 B, 4 C; 74/479, 480 R, 480 B, 481, 482, 483 R, 483 K, 473 R, 474, 477

[56] References Cited

U.S. PATENT DOCUMENTS

| | | | |
|---|---|---|---|
| 3,316,773 | 5/1967 | Findlay | 74/481 |
| 3,626,780 | 12/1971 | Lowder et al. | 74/473 R |
| 3,710,904 | 1/1973 | Boyer et al. | 192/4 A |
| 3,768,329 | 10/1973 | Comer, Jr. et al. | 74/477 |
| 3,795,157 | 3/1974 | Campbell et al. | 74/473 R X |
| 3,858,695 | 1/1975 | Whisler | 192/4 A |
| 3,967,709 | 7/1976 | Cole et al. | 192/4 A |
| 3,995,426 | 12/1976 | Habiger | 74/480 R X |

Primary Examiner—Allan D. Herrmann
Attorney, Agent, or Firm—Wegner, Stellman, McCord, Wiles & Wood

[57] ABSTRACT

A control for controlling the operation of a vehicle drive having speed control apparatus including a movable control element for causing the speed of the drive to vary in accordance with the positioning of the control element. The control element may be moved by means of a manually operable speed lever. A manually operable range selector lever is provided for actuating an adjusting apparatus for causing the amount of movement of the control element caused by a movement of the speed lever to be selectively varied. The adjusting apparatus may include a pair of cams, an actuator apparatus, movable selectively against the camming surfaces of either of the cams as a function of the movement of the speed lever. The cams are connected to the control element for providing resultingly a variable amount of movement of the control element selectively in either of the reverse or forward directions.

16 Claims, 9 Drawing Figures

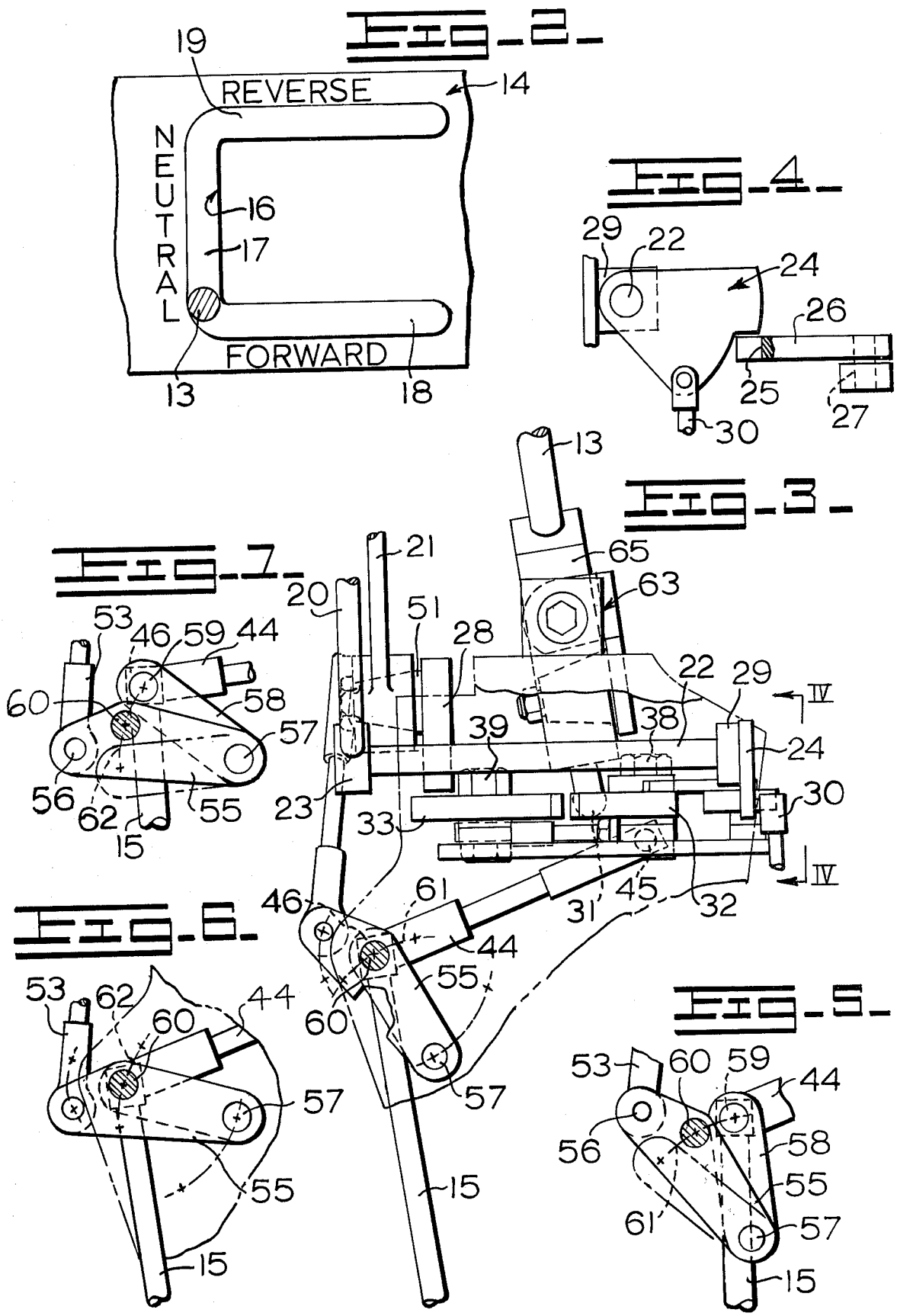

HYDROSTATIC TRANSMISSION CONTROL

BACKGROUND OF THE INVENTION

1. Field of the Invention

This invention relates to vehicle drives and, in particular, speed control means for use in vehicle drives.

2. Description of the Prior Art

In one conventional form of vehicle drive, a hydrostatic transmission is provided which is controlled to provide variable speed driving of the vehicle. The transmission may be controlled by a control element which is movable in different directions so as to provide variable speed in a forward direction as well as variable speed in a reverse direction.

It is further conventional in the control of such vehicle drives to provide a speed lever at a console available to the operation of the vehicle. Conventionally, such a speed lever is arranged to be movable in a U-shaped path with the interconnecting means between the speed lever and the transmission control means providing a neutral operation of the drive when the speed lever is in the bight portion of the U-shaped path and a variable speed operation of the drive when the speed lever is moved selectively outwardly along either of the legs of the U-shaped path, with the drive operating the vehicle in a forward direction when the speed lever is in one of the legs and in a reverse direction when the speed lever is in the other of the legs.

SUMMARY OF THE INVENTION

The present invention is concerned with an improved means for utilizing selective movement of such a speed lever to provide improved control of the reversible drive of the vehicle.

More specifically, the present invention comprehends an improved means for providing selective range of operation of the vehicle drive by suitable manipulation of a manually operable range selector lever which may be disposed adjacent the speed control lever. Thus, when the operator wishes to control the speed of the vehicle in either of its reversible directions over the normal full speed range, the range selector lever may be disposed by the operator in a normal position. However, when the operator wishes to utilize the same amount of movement of the speed lever to provide a different range of speed of the vehicle, he may arrange the range selector lever in a different position whereby an automatic modification in the amount of movement of the speed control means effected by a given amount of movement of the speed lever is provided.

In the illustrated embodiment, the adjusting means defines means for changing the arcuate movement of a portion of the control element effected by corresponding movement of the connecting means.

Further more specifically, the adjusting means may comprise a pair of cams having confronting camming surfaces against which actuator means are movable selectively as a function of movement of the speed lever so as to correspondingly move the cam means. The cam means, in turn, are connected to the control element and resultingly provide variable amount of movement of the control element. In the illustrated embodiment, the cam means are pivotally mounted and are interconnected.

BRIEF DESCRIPTION OF THE DRAWING

Other features and advantages of the invention will be apparent from the following description taken in connection with the accompanying drawing wherein:

FIG. 2 is a fragmentary view illustrating the U-shaped movement of the speed control lever in effecting the desired reversible speed control of the drive;

FIG. 3 is a fragmentary side elevation of the control;

FIG. 4 is a fragmentary vertical section taken substantially along the line 4—4 of FIG. 3;

FIGS. 5, 6 and 7 are fragmentary elevations illustrating different positions of the connecting and adjusting means of the control in effecting reversible speed control of the drive;

DESCRIPTION OF THE PREFERRED EMBODIMENT

Figure 1:
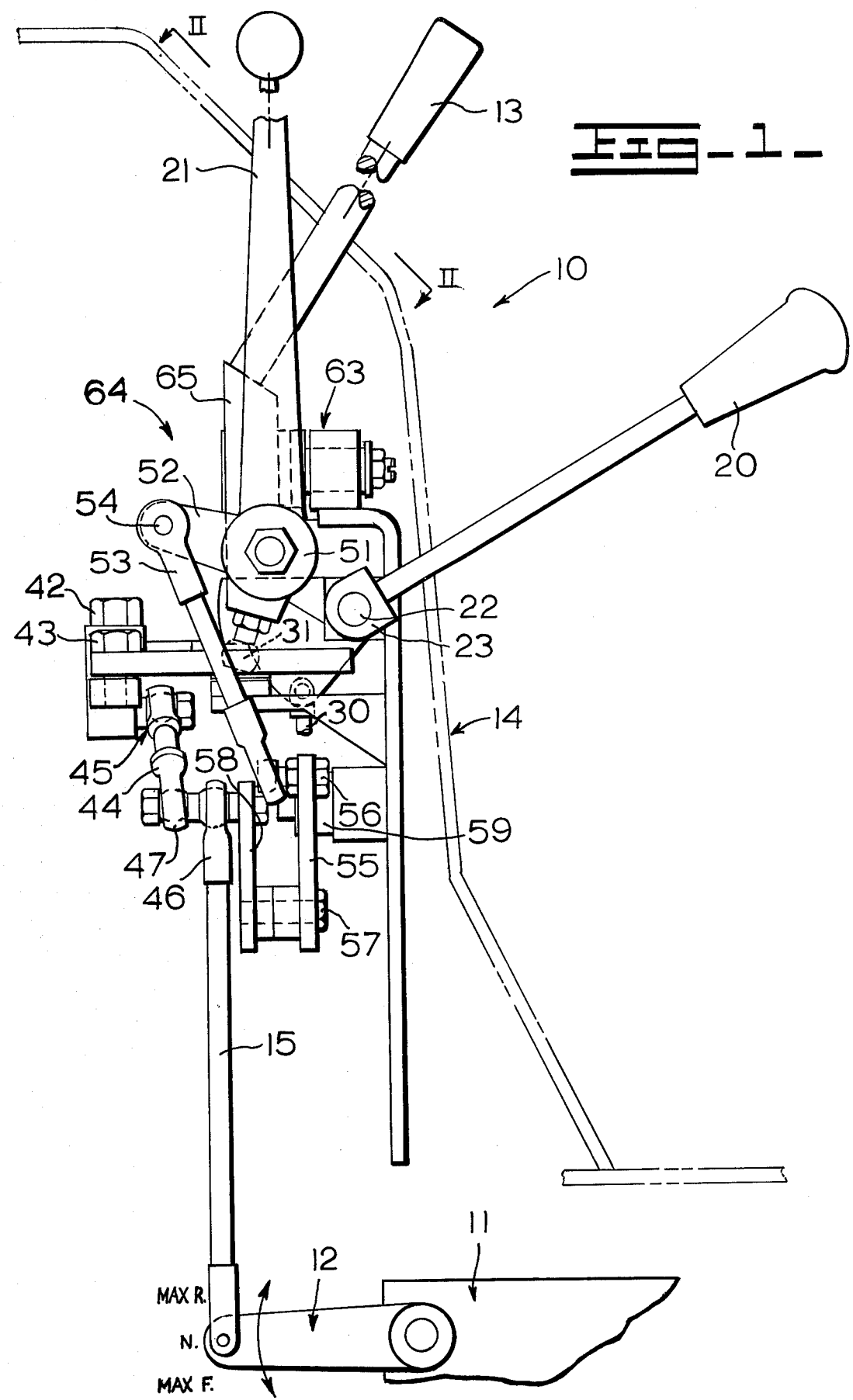
FIG. 1 is a fragmentary elevation of a vehicle drive control embodying the invention.

In the exemplary embodiment of the invention as disclosed in the drawing, a vehicle drive speed control means generally designated 10 include hydrostatic transmission means generally designated 11 for providing selective speed control of the vehicle drive in both a forward and reverse direction. A control element 12 may be pivotally associated with the transmission to swing from a central neutral position alternatively in one direction to a maximum forward speed position and in the opposite direction to a maximum reverse speed position. The present invention is concerned with an improved means for controlling the movement of the speed control element 12 from a manually operable speed lever generally designated 13 which may be conventionally mounted in a console 14 for manipulation by the vehicle operator. As shown in FIG. 1, the control structure generally designated 64 may be mounted within the console and may be connected to the control element 12 by a connecting rod 15 which, as a result of controlled longitudinal movement, effects the desired swinging position of the control element.

As shown in FIG. 2, the speed lever 13 is movable in a U-shaped path by the operator of the vehicle to effect the desired speed control of the vehicle drive. The U-shaped path may be defined by a U-shaped slot 16 in the console housing with the slot including a bight portion 17, a first leg portion 18, and a second leg portion 19. Conventionally, when the speed control lever is in the bight portion 17, the drive transmission 11 is in a neutral condition, when the speed lever 13 is in the leg 18, the drive transmission is in a forward driving position wherein the speed thereof is a function of the displacement of the speed lever 13 from the bight portion 17 of the slot. When the speed control lever 13 is in the other leg 19 of the slot, the drive is in a reverse driving condition with the reverse speed of the vehicle corresponding to the displacement of the lever 13 from the bight portion 17 of the slot.

As further shown in FIG. 1, also available to the operator at the console 14 is a brake lever 20 and a range selector lever 21.

Figure 8:
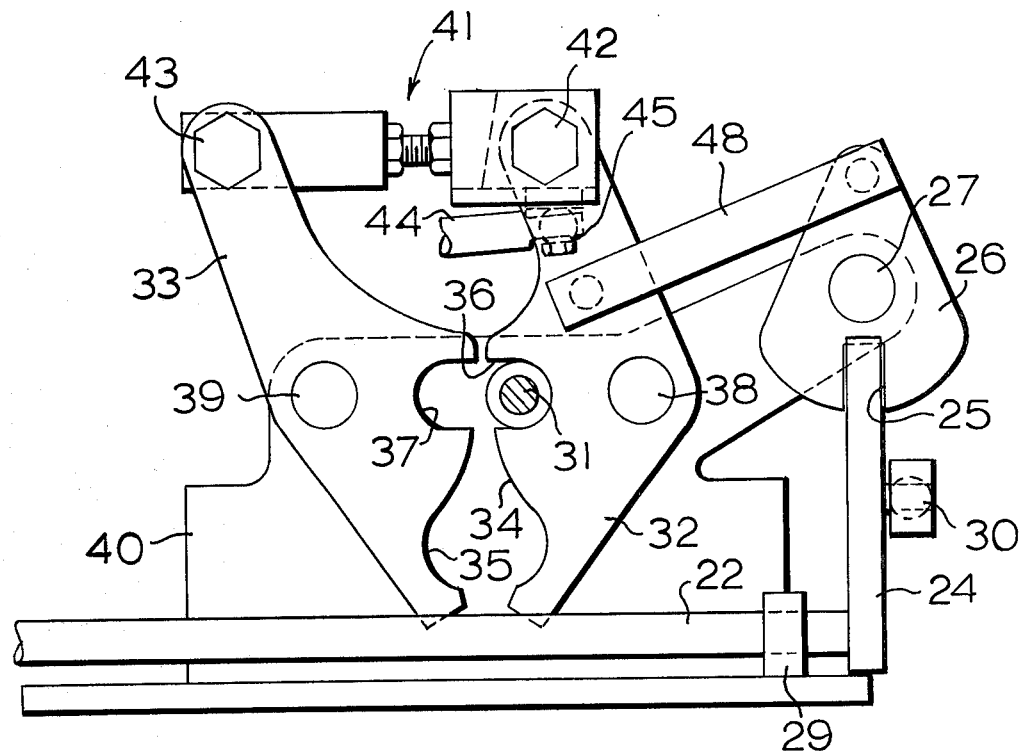
FIG. 8 is a fragmentary plan view of a portion of the connecting means locked in a neutral position.

As shown in FIG. 3, the brake lever 20 is connected to a transverse shaft 22 by a connector 23. The distal end of the shaft carries a butterfly cam 24 which is selectively receivable in a notch 25 of a locking member 26 mounted on a pivot 27. Shaft 22 may be suitably journaled in bearings 28 and 29. Rotation of the cam 24 is permitted when the cam is aligned with the notch 25, as shown in FIGS. 4 and 8, so as to operate a brake linkage 30. As will be brought out more fully hereinafter, notch 25 is aligned with the brake cam 26 only when the speed control lever 13 is in the neutral portion 17 of the control slot. Thus, the parking brake controlled by the linkage is settable by the operator only when the drive is in the neutral condition.

As best seen in FIG. 1, speed lever 13 includes a lower portion 65 provided at its lower end with a ball connector 31. Lever portion 65 is mounted in a universal mount generally designated 63 so as to permit the U-shaped movement of the outer end of the speed lever 13 illustrated in FIG. 2. Ball connector 31 is correspondingly moved in a generally U-shaped path in accordance with the positioning of the speed lever.

Figure 9:
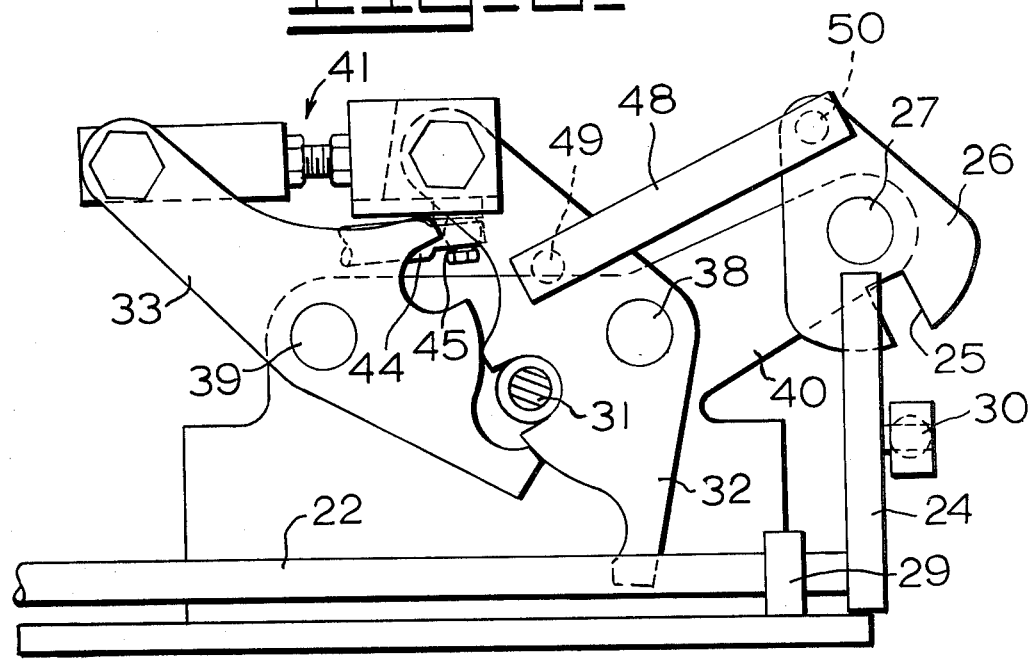
FIG. 9 is a fragmentary plan view generally similar to that of FIG. 8 but with the connecting means in a forward drive arrangement.

As best seen in FIGS. 3, 8 and 9, ball connector 31 is selectively engageable with a pair of speed control cams 32 and 33 having mutually confronting cam surfaces 34 and 35, respectively. When the speed lever 13 is in the neutral position, ball connector 31 is received in either of a pair of complementary recess portions 36 and 37 of cam surfaces 34 and 35, respectively. In the illustrated embodiment, cam 32 comprises the forward speed cam and cam 33 comprises the reverse speed cam. Thus, when the speed control lever is in the neutral position at the inner end of the forward leg 18 of slot 16, the connector 31 is received in the recess 36 of cam 32. Moving the lever from the position of FIG. 2 to the other end of the bight portion 17 of the slot 16 transfers the connector 31 from recess 36 into recess 37 of cam 33 while maintaining the positioning of the cams as shown in FIG. 8.

Cam 32 is pivotally mounted on a pivot 38 and cam 33 is pivotally mounted on a pivot 39 having its axis parallel to the axis of pivot 38, with the pivots being mounted to a support 40, as shown in FIG. 8. The cams are interconnected by an adjustable connector generally designated 41 by means of a pivot 42 connecting cam 32 to the connector 41 and a pivot 43 connecting the cam 33 to the connector 41. A connecting link 44 is connected to the connector 41 by a ball joint 45 so as to be longitudinally movable as the result of a swinging of the cams by the ball connector 31. Link 44 is connected to the upper end 46 of the connecting rod 15 by a ball joint 47.

As further shown in FIGS. 8 and 9, control of the positioning of locking member 26 is effected by a link 48 having one end connected to cam 32 by a pivot 49 and the opposite end connected to member 26 by a pivot 50. Thus, as illustrated in FIGS. 8 and 9, pivotal movement of cam 32 about pivot 38 causes angular positioning of the member 26 so as to either align notch 25 with the parking brake cam or disalign it therewith.

As seen in FIGS. 2 and 9, when the speed lever 13 is moved along the forward leg 18 of slot 16 to move the ball connector 31 from the neutral position of FIG. 8 to the driving position of FIG. 9, the connector 31 in recess 36 of cam 32 causes the cam to pivot in a counterclockwise direction about pivot 38 thereby moving link 44 to the left and concurrently pivoting locking member 26 in a counterclockwise direction to move notch 25 out of alignment with parking brake cam 24. Such longitudinal movement of link 44 effects a movement of connecting rod 15 so as to rotate the control element 12 in a counterclockwise direction to cause operation of the vehicle drive at a corresponding forward speed. At the same time, the disalignment of notch 25 relative to the cam 24 prevents operating the parking brake lever 20 while the vehicle is in motion.

As will be obvious, a reverse movement of the speed lever 13 into the reverse leg 19 of slot 16 transfers the connector 31 into recess 37 of cam 33 and movement along the leg 19 causes movement of the cam 33 in a clockwise direction about pivot 39 so as to move connector 41 and link 44 connected thereto toward the right so as to provide a variable speed control of the drive in a reverse direction by a swinging of the control element 12 in a clockwise direction from the neutral position illustrated in FIG. 1.

As indicated above, the present invention comprehends the provision of means for varying the amount of movement of the control element produced by a given amount of movement of the speed lever 13. Thus, in effect, these means provide a control of the speed range of the vehicle drive. More specifically, the speed range control is effected by suitable manipulation of the range selector lever 21 by the operator. As seen in FIGS. 1-7, the range selector lever 21 is pivotally mounted on a friction pivot 51 and is provided with a crank arm 52. A connecting link 53 is connected to the crank arm 52 by a pivot 54. The distal end of the connecting link 53 is connected to one end of a control link 55 by a pivot 56. The other end of control link 55 is connected by a pivot 57 to a second control link 58. The other end of control link 58, in turn, is connected by a pivot 59 to end 46 of the connecting rod 15.

In the illustrated embodiment, the range selector lever 21 selectively causes the driving range to be either the maximum driving range of a low-keyed driving range wherein the maximum speed of the drive is approximately one-fifth that of the maximum range. The control of the speed range is effected, as illustrated in FIGS. 3, 5, 6 and 7, by swinging the control link 55 rotatably on a pivot 59 at a midportion of the control link 55. Thus, when the range selector lever is in the position of FIG. 1 with the connecting link 53 in its uppermost position, link 55 is positioned on a pivot 60, as shown in FIGS. 3 and 5, so as to dispose pivot 57 in a lowermost position and thereby cause the swinging of link 58 as a result of longitudinal movement of link 44 to cause movement of pivot 59 to be in a generally horizontal arc 61. Resultingly, the longitudinal movement of connecting rod 15 is relatively small for a given longitudinal displacement of link 44 as the two movements are somewhat transverse to each other.

However, when it is desired to utilize the maximum speed range of the drive, the range selector lever is moved in a counterclockwise direction, as seen in FIG. 1, to move the connecting link 53 downwardly and thereby swing the control link 55 in a counterclockwise direction on pivot 60 to a generally horizontal position, as shown in FIGS. 6 and 7. Such repositioning of control link 55 raises the pivot 57 and, thus, causes the second control link 58 to swing to a more horizontal position whereby the arc of movement 62 of the pivot 59 is in a generally vertical direction, thus causing maximum longitudinal movement of the connecting rod 15 for a given amount of movement of the link 44.

In the illustrated embodiment, each of ball joint 63 and pivot 51 define friction connections so as to prevent movement of either of the levers 13 or 21 by a movement of the opposite one, as discussed above.

Thus, the invention broadly comprehends providing an improved adjusting means in association with a range selector lever for causing the amount of movement of the control element of the drive transmission caused by a given movement of the speed lever to be selectively varied at the discretion of the operator. As will be obvious to those skilled in the art, the improved control means permits an infinite adjustment of the control range as by suitably retaining the range selector lever in any desired position disposing the connecting link 53 intermediate the illustrated positions of FIGS. 3, 5, 6, and 7.

Further it may be seen, with reference to FIGS. 4 and 8, that when the parking brake lever 20 is positioned to engage the cam 24 with the locking member 26 in the notch 25, the speed lever can no longer be moved out of neutral to either of the forward or reverse legs 18 and 19 of the control slot, thus preventing driving operation of the vehicle while the parking brake is applied.

The speed control means of the present invention is extremely simple and economical of construction while yet providing an improved control of the vehicle drive and permitting facilitated control of the speed range obtained by movement of the conventional speed lever at the operating console. The relatively simple construction of the apparatus provides long troublefree life while yet providing the improved functioning discussed above.

The foregoing disclosure of specific embodiments is illustrative of the broad inventive concepts comprehended by the invention.

The embodiments of the invention in which an exclusive property or privilege is claimed are defined as follows:

1. In a vehicle drive having speed control means including a movable control element for causing the speed of the drive to vary in accordance with the positioning of said control element, and a manually operable speed lever, the improvement comprising: a manually operable range selector lever; connecting means interconnecting said speed lever and said control element for moving said control element as a function of movement of said speed lever; and adjusting means connected to said range selector lever for causing the amount of movement of said control element resulting from a movement of said speed lever to be any one of a plurality of preselected amounts.

2. The vehicle drive means of claim 1 wherein said adjusting means comprises link means interconnecting said range selector lever, and said control element.

3. The vehicle drive means of claim 1 wherein said adjusting means comprises link means interconnecting said range selector lever, said connecting means, and said control element.

4. The vehicle drive means of claim 1 wherein said connecting means comprises means for moving a portion of said control element in an arc to effect the speed control variable positioning of said control element, and said adjusting means comprises means for selectively changing the direction of the arc to correspondingly change the amount of movement of the control element effected by a movement of the speed lever.

5. The vehicle drive means of claim 1 wherein said speed control means is reversible and said control element is selectively movable in forward and reverse directions to effect speed control of the drive in both forward and reverse directions.

6. The vehicle drive means of claim 1 further including means for locking said connecting means in a neutral position to prevent driving operation.

7. The vehicle drive means of claim 1 wherein said adjusting means causes said movement to be alternatively a large movement or a small movement.

8. The vehicle drive means of claim 1 wherein said speed lever and said range selector lever are juxtaposed.

9. In a vehicle drive having speed control means including a movable control element for causing the speed of the drive to vary in accordance with the positioning of said control element, and a manually operable speed lever, the improvement comprising: a manually operable range selector lever; connecting means interconnecting said speed lever and said control element for moving said control element as a function of movement of said speed lever; and adjusting means connected to said range selector lever for causing the amount of movement of said control element caused by a movement of said speed lever to be selectively varied, said connecting means including a pair of opposed cam followers and said speed lever being arranged to move a cam element selectively against said cam followers for causing adjustable movement of the control element.

10. The vehicle drive means of claim 9 wherein movement of said cam against one of said cam followers causes movement of said control element to provide variable forward speed control, and movement of said cam element against the other of said cam followers causes movement of said control element to provide variable reverse speed control.

11. In a vehicle drive having reversible speed control means including a movable control element for causing the speed of the drive in either direction to vary in accordance with the positioning of said control element, and a manually operable speed lever, the improvement comprising:

a pair of cams having mutually confronting camming surfaces;

actuator means movable selectively against either of said camming surfaces as a function of movement of said speed lever for moving the cam provided with the selected camming surface; and means connecting the cams to said control element for providing variable movement of said control element selectively in either of two manners for effecting selectively reversible, variable speed operation of the drive.

12. The vehicle drive means of claim 11 wherein said connecting means includes means for interconnecting said cams.

13. The vehicle drive means of claim 11 wherein said connecting means includes adjustable means for interconnecting said cams.

14. The vehicle drive means of claim 11 wherein means are provided for pivotally mounting said cams for pivoting about parallel axes.

15. The vehicle drive means of claim 11 wherein means are provided for selectively locking said cams in a neutral position wherein said drive is caused to be at zero speed.

16. The vehicle drive means of claim 11 wherein said camming surfaces are reversely similar.

* * * * *